(12) United States Patent
Mäenpää et al.

(10) Patent No.: US 10,015,068 B2
(45) Date of Patent: Jul. 3, 2018

(54) METHODS AND DEVICES FOR MEDIA PROCESSING IN DISTRIBUTED CLOUD

(71) Applicant: Telefonaktiebolaget LM Ericsson (publ), Stockholm (SE)

(72) Inventors: Jouni Mäenpää, Nummela (FI); Abu Shohel Ahmed, Espoo (FI); Jari Arkko, Kauniainen (FI); Tommi Roth, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 36 days.

(21) Appl. No.: 15/036,375

(22) PCT Filed: Nov. 13, 2013

(86) PCT No.: PCT/SE2013/051337
§ 371 (c)(1),
(2) Date: May 12, 2016

(87) PCT Pub. No.: WO2015/072898
PCT Pub. Date: May 21, 2015

(65) Prior Publication Data
US 2016/0285720 A1    Sep. 29, 2016

(51) Int. Cl.
*H04L 12/26*    (2006.01)
*H04L 29/06*    (2006.01)
(Continued)

(52) U.S. Cl.
CPC ........ *H04L 43/0852* (2013.01); *H04L 65/605* (2013.01); *H04L 65/607* (2013.01);
(Continued)

(58) Field of Classification Search
None
See application file for complete search history.

(56) References Cited

U.S. PATENT DOCUMENTS 7,616,585 B1    11/2009  Kritov et al.
9,596,497 B2 *   3/2017  Chiarulli ............. H04N 21/235
(Continued)

FOREIGN PATENT DOCUMENTS

WO    2013034584 A1    3/2013

OTHER PUBLICATIONS

Schulzrinne, H. et al., "RTP: A Transport Protocol for Real-Time Applications", RFC 3550. Network Working Group; Request for Comments: 3550; Request for Comments 3550. The Internet Society. Jul. 2003. 1-104., Jul. 2003, 1-72.
(Continued)

*Primary Examiner* — Kibrom T Hailu
(74) *Attorney, Agent, or Firm* — Sage Patent Group

(57) ABSTRACT

The disclosure relates to a method 30 for handling latency performed in a node 12, $15_1$, $15_2$, $15_3$, . . . , $15n$ of a distributed cloud 11. The node 12, $15_1$, $15_2$, $15_3$, . . . , $15n$ is configured to handle a subset of media processing required by a media service and the distributed cloud 11 comprising two or more such nodes 12, $15_1$, $15_2$, $15_3$, . . . , $15n$, wherein a communication path for the media service is configured between at least a first and a second communication device $14_1$, $14_2$. The media service is provided by media streams comprising media packets and the communication path involving two or more of the nodes 12, $15_1$, $15_2$, $15_3$, . . . , $15n$. The method 30 comprises: determining 31 processing delay of processing the media packet in the node 12, $15_1$, $15_2$, $15_3$, . . . , $15n$ the processing delay constituting a first delay contribution; attaching 32 metadata to the media packet, the metadata comprising information about the first delay contribution added to any accumulated delay contributions experienced by the media packet along the communication path.

17 Claims, 4 Drawing Sheets

(51) Int. Cl.
*H04N 21/235* (2011.01)
*H04N 21/24* (2011.01)
*H04L 29/08* (2006.01)

(52) U.S. Cl.
CPC .............. *H04L 65/80* (2013.01); *H04L 67/10* (2013.01); *H04N 21/2353* (2013.01); *H04N 21/2402* (2013.01)

(56) References Cited

U.S. PATENT DOCUMENTS

| | | | |
|---|---|---|---|
| 2006/0215567 A1 | 9/2006 | Raghunath et al. | |
| 2007/0097865 A1* | 5/2007 | Song | H04J 3/247 370/235 |
| 2008/0267069 A1* | 10/2008 | Thielman | H04N 7/142 370/235 |
| 2013/0227116 A1* | 8/2013 | Radhakrishnan | H04L 41/0823 709/224 |
| 2014/0351874 A1* | 11/2014 | Yoo | H04N 21/6437 725/116 |
| 2014/0362832 A1* | 12/2014 | Rudolf | H04L 1/1822 370/336 |
| 2015/0113576 A1* | 4/2015 | Carroll | H04N 21/242 725/109 |

OTHER PUBLICATIONS

Unknown, Author, "Series G: Transmission Systems and Media, Digital Systems and Networks", International Telecommunication Union, One-way Transmission Time, ITU-T Rec. G.114, International telephone connections and circuits—General recommendations on the transmission quality for an entire international telephone connection, May 2003, 1-20.

* cited by examiner

METHODS AND DEVICES FOR MEDIA PROCESSING IN DISTRIBUTED CLOUD

TECHNICAL FIELD

The technology disclosed herein relates generally to the field of distributed cloud environments, and in particular to media processing of e.g. real-time communications in such environments.

BACKGROUND

In a conventional centralized cloud environment, all computing is typically executed in a single large centralized data center. In contrast, a distributed cloud comprises a potentially high number of geographically dispersed data centers instead of only one central data center. These geographically dispersed data centers have different capabilities; some of the data centers may be relatively small and be located at the edge of a network comprising the distributed cloud environment, whereas others may be located at the core of the network and have a very high capacity.

Traditionally, Unified Communications (UC) services, such as multiparty audio and video conferencing, have been provided using dedicated server hardware and Digital Signal Processors (DSPs). Today, there is an increasing trend to migrate hardware-based UC solutions to a fully software-based cloud environment. The first step in this migration is to provide software-based UC services in a centralized cloud environment. The next foreseen step is to provide them in a distributed cloud environment.

FIG. 1 illustrates a simple example of media processing in a distributed cloud environment, in the following also referred to as network 1. In the figure, a distributed cloud 2 provides a video conference service for four users A, B, C and D. Media processing is distributed in the cloud 2 in such a way that there are local Media Server (MS) instances 3A, 3B, 3C located close to the users at the edge of the network 1. Further, processing such as audio mixing and switching for the video conference is being handled by a Media Server 3 in a large data center at the core of the network 1. Each Media Server instance is running in one Virtual Machine (VM) within a respective data center. A reason for distributing media processing to several virtual machines (i.e. a chain of virtual machines) is that the capacity of a single virtual machine is typically not sufficient for handling the media processing for all the users in a conference. This is very much the case for example in a high definition video conference where users are using different codecs and wherein transcoding thus is required.

It is beneficial to distribute the media processing to virtual machines in different data centers since latencies can be minimized and responsiveness maximized when media processing occurs as close to the conference participants as possible. Latencies need to be minimized to improve the quality of the service as experienced by the users. An example of such maximized responsiveness is the ability to adapt the video streams being sent towards the user using feedback from a local Radio Access Network (RAN). However, distribution of media processing also results in some challenges as will be described next.

An important challenge introduced when media processing of a multimedia session (e.g. a video conference) is distributed from one media server to a chain of media servers is increased latency. Although latencies are typically short when users behind the same distributed media server instance are communicating with each other, media streams between users at different ends of the media processing chain may experience long delays. This is simply due to the fact that when the media streams from e.g. user A to user B go via multiple media servers (3A, 3, 3B in the example of FIG. 1), the processing done by each individual media server 3A, 3, 3B adds to the end-to-end delay that Real-time Transport Protocol (RTP) packets carrying the multimedia session experience. As an example, if the multimedia goes through a chain of three media servers the delay introduced by processing on the media servers might, in a worst case scenario, be threefold compared to a scenario wherein a single high-capacity central media server is being used.

According to Telecommunication Standardization Sector (ITU-T) recommendation G.114 [ITU-T G.114], in order to keep users satisfied, the one-directional (i.e., mouth-to-ear) media delay between users should be no more than 225 ms. If the delay exceeds 300 ms, some of the users will already start becoming dissatisfied. It is not uncommon for a single software-based media server performing media decoding and encoding to add to the end-to-end delay that RTP packets experience in the order of 100 ms. Thus, already the presence of three media servers that encode and decode the media is enough to make some of the users dissatisfied. This introduces the need for mechanisms that can keep the delay acceptable even when multiple media servers are involved in the media path.

SUMMARY

An object of the present teachings is to solve or at least alleviate at least one of the above mentioned problems.

The object is according to a first aspect achieved by a method for handling latency performed in a node of a distributed cloud. The node is configured to handle a subset of media processing required by a media service and the distributed cloud comprises two or more such nodes, wherein a communication path for the media service is configured between at least a first and a second communication device. The media service is provided by media streams comprising media packets and the communication path involving two or more of the nodes. The method comprises: determining processing delay of processing the media packet in the node, the processing delay constituting a first delay contribution; attaching metadata to the media packet, the metadata comprising information about the first delay contribution added to any accumulated delay contributions experienced by the media packet along the communication path.

By means of the method real-time monitoring of the performance of a chain of multiple media servers and user devices in a multimedia conferencing system is enabled, the multimedia conferencing system for example running on virtualized servers in a distributed cloud environment. Further, the method also enables real-time adjustment of the media processing chain. Such adjustment ensures that requirements related to user experience and Service Level Agreements (SLAs) can be met. Further still, by means of the method virtualized, distributed media processing is facilitated to achieve performance levels closer to or on par with traditional, centralized and hardware based media processing solutions.

The object is according to a second aspect achieved by a node of a distributed cloud. The node is configured to handle a subset of media processing required by a media service and the distributed cloud comprises two or more such nodes, wherein a communication path for the media service is configured between at least a first and a second communication device. The media service is provided by media streams comprising media packets and the communication path involving two or more of the nodes. The node comprises a processor and memory, the memory containing instructions executable by the processor, whereby the node is operative to: determine processing delay of processing the media packet in the node, the processing delay constituting a first delay contribution; attach metadata to the media packet, the metadata comprising information about the first delay contribution added to any accumulated delay contributions experienced by the media packet along the communication path.

The object is according to a third aspect achieved by a computer program for a node of a distributed cloud. The node is configured to handle a subset of media processing required by a media service. The distributed cloud comprises two or more such nodes, wherein a communication path for the media service is configured between at least a first and a second communication device. The media service is provided by media streams comprising media packets and the communication path involving two or more of the nodes. The computer program comprises computer program code, which, when run on the node causes the node to: determine processing delay of processing the media packet in the node, the processing delay constituting a first delay contribution; attach metadata to the media packet, the metadata comprising information about the first delay contribution added to any accumulated delay contributions experienced by the media packet along the communication path.

The object is according to a fourth aspect achieved by a computer program product comprising a computer program as above, and a computer readable means on which the computer program is stored.

Further features and advantages of the present teachings will become clear upon reading the following description and the accompanying drawings.

DETAILED DESCRIPTION

Figure 1:
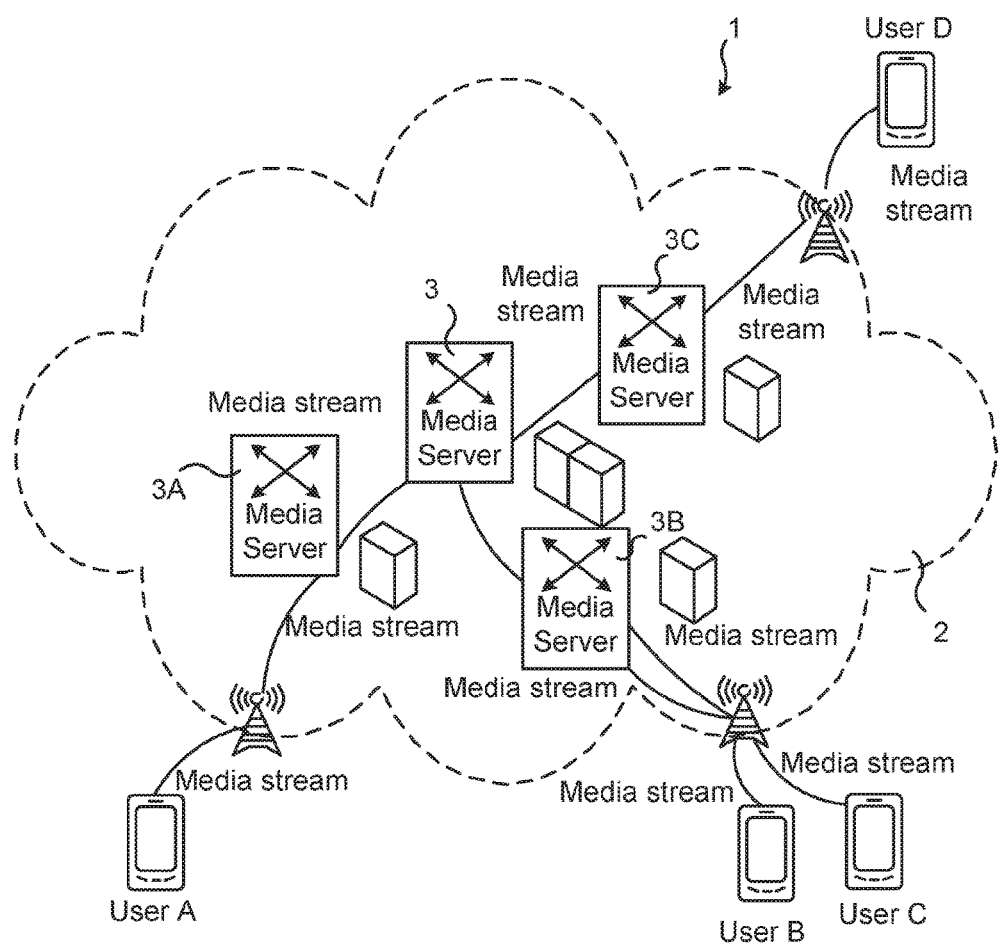
FIG. 1 illustrates a distributed cloud.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, in an aspect, the present teachings addresses problems associated with increased mouth-to-ear delay that media processing that is done on a chain of virtualized media servers causes. In different aspects of the present teachings, these problems are overcome by attaching metadata to the media packets. The metadata may comprise, among other things, information about the accumulated latency that the media packets have experienced so far. The metadata may also comprise information about the mouth-to-ear delay target for the media stream and about the priority of this media stream. The metadata may be used to identify where in the network problems are occurring and/or for dynamically re-configure the chain of media servers whenever necessary to keep the mouth-to-ear delay within acceptable limits.

Figure 2:
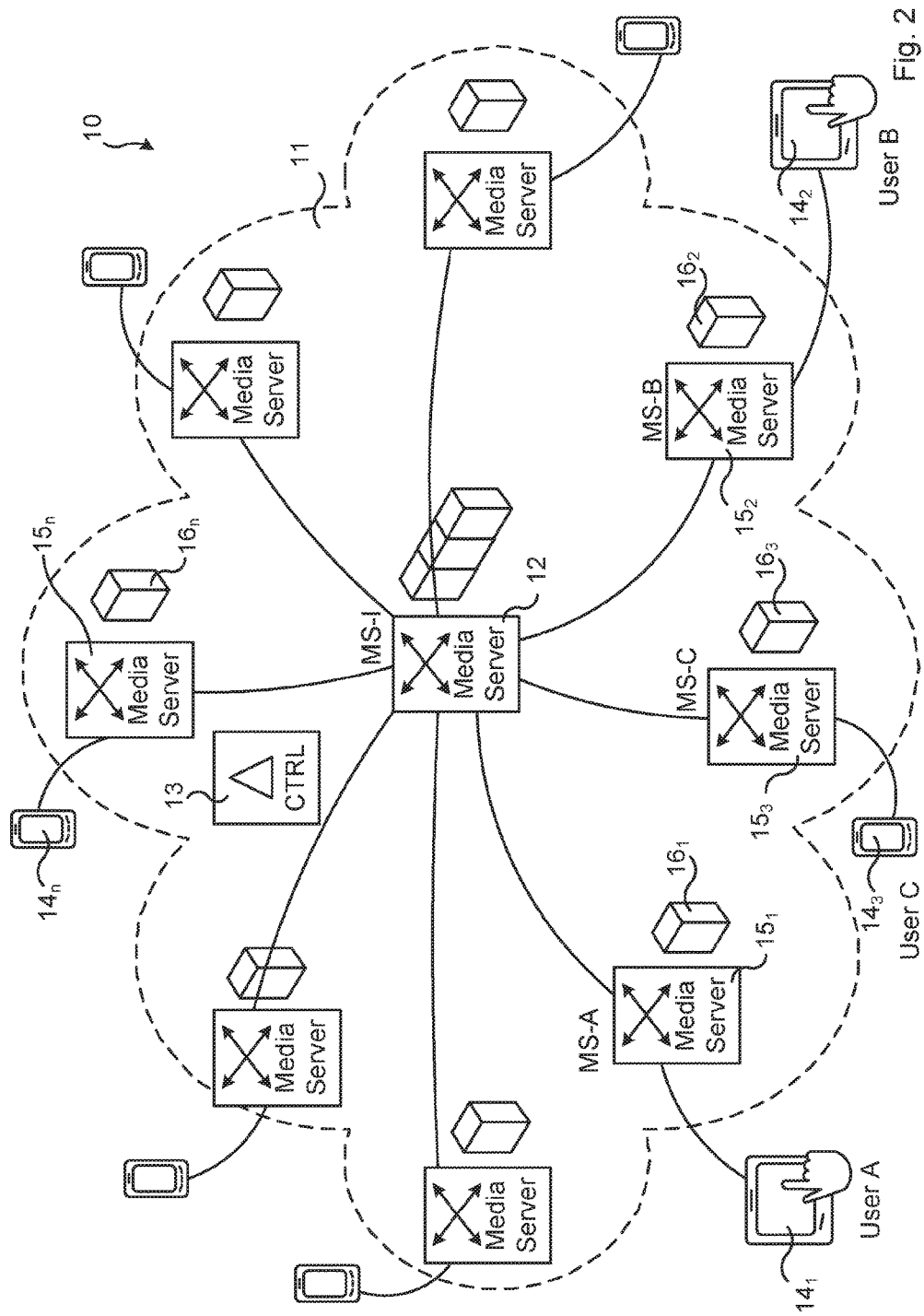
FIG. 2 illustrates a distributed cloud environment in which embodiments of the present teachings may be implemented.

FIG. 2 illustrates a distributed cloud environment in which embodiments of the present teachings may be implemented. In the figure, the distributed cloud environment, also denoted network in the following is indicated at reference numeral 10. A distributed cloud 11 is part of the network 10 and comprises media server instances, or media servers 12, $15_1$, $15_2$, $15_3$, ..., $15_n$. A media server 12 is acting as a main media server 12 for a multimedia service, such as a video conference. As a main media server 12, the media server 12 is responsible for acting as the main media stream processor. In addition to the main media server 12, there are also a number of distributed media servers $15_1$, $15_2$, $15_3$, ..., $15_n$ to which a subset of the media processing required by the multimedia service is distributed.

The distributed cloud 11 also comprises a controller node (denoted CTRL in the figure), indicated at reference numeral 13, that is connected to all of the media servers in order to control them.

The distributed cloud 11 is accessed by communication devices $14_1$, $14_2$, $14_3$, ..., $14_n$, which may comprise for example wireless communication devices such as smart phones or tablet computers.

The distributed cloud 11 further comprises a number of data centers $16_1$, $16_2$, $16_3$, ..., $16_n$, which may be of different sizes. Each media server 12, $15_1$, $15_2$, $15_3$, ..., $15_n$ is running in one Virtual Machine (VM) within a respective such data center $16_1$, $16_2$, $16_3$, ..., $16_n$.

In the following, the video conference is used as a particular example for illustrating aspect of the present teachings. It is however noted that the multimedia service may be any other service as well. The main media server 12 is acting as the main video switch and audio mixer for the video conference. The distributed media servers $15_1$, $15_2$, $15_3$, ..., $15_n$ handle a subset of the media processing required by the video conference. In this example, the majority of the users participating in the conference use the H.264 video codec and the G.711 audio codec. For this reason, the main media server 12 uses H.264 and G.711 as the main video codec and audio codec for the video conference. For efficiency reasons, all the video streams that the main media server 12 receives should be in the same format; since it receives only one video format, the main media server 12 does not need to perform video transcoding when it carries out video switching for the video conference. Thus, all the video streams that the main media server 12 receives from the distributed media servers $15_1$, $15_2$, $15_3$, ..., $15_n$ are H.264-encoded. In addition, in this particular video conference the main media server 12 prefers to receive G.711 audio from distributed media servers $15_1$, $15_2$, $15_3$, ..., $15_n$ in order to save computational resources. The distributed media servers $15_1$, $15_2$, $15_3$, ..., $15_n$ are serving users that have communication devices $14_1$, $14_2$, $14_3$, ..., $14_n$ comprising advanced audio codecs such as OPUS in communication device $14_1$ used by user A and Enhanced Voice Service (EVS) in communication device $14_2$ used by user B. Media streams being coded by such advanced audio codecs are also expensive to decode and encode.

The controller node 13 is connected to all of the media servers 12, $15_1$, $15_2$, $15_3$, . . . , $15_n$ in order to control them.

In the above example, particular examples are given for exemplifying aspects of the present teachings, for example mentioning G.711, which is an ITU-T standard for audio companding and H.264, which is a video codec standard, and OPUS, which is an audio compression format. It is however noted that the present teachings are not limited to these particular examples, but encompasses various different standards and formats used for media processing. Thus, the present teachings are applicable to any audio and video codecs besides the ones mentioned.

Two of the users in the example of FIG. 2 that are connected to the video conference are not using H.264 as the video codec. The communication device $14_1$ of user A is only supporting the VP8 video codec and the communication device $14_1$ of user B is only supporting the High Efficiency Video Coding (HEVC) codec. Since these two users A, B are using a different codec than what the main media server 12 requires, the distributed media servers $15_1$, $15_2$ serving user A and user B, respectively, need to transcode VP8 and HEVC to H.264.

From the viewpoint of user B, in a situation in which user A is the active speaker of the conference, the media streams from user A are encoded and decoded several times before they are finally played out to user B. In particular:

Step 1: User A's communication device $14_1$ encodes the video input from the communication device's $14_1$ camera to VP8. It also encodes user A's speech to OPUS.

Step 2: Distributed media server $15_1$ transcodes the VP8 video to H.264 video and the OPUS audio to G.711 audio.

Step 3: Main media server 12 mixes user A's audio stream to the main audio mix of the video conference. This involves decoding and encoding the G.711 audio. In addition, the main media server 12 performs video switching using active speaker recognition.

Step 4: Distributed media server $15_2$ transcodes the H.264 video it receives from the main media server 12 to HEVC. It also transcodes the G.711 audio to EVS audio.

Step 5: User B's communication device $14_2$ decodes the HEVC video and the EVS audio stream before playing them to user B.

As mentioned in the background section, the use of even three media servers that encode and decode the media is enough to make some of the users dissatisfied due to delay. For the particular example above there is much cost in terms of delay for steps 1-5 above. An example of a realistic situation is as follows:

The media processing in step 1 by user A's communication device $14_1$ adds 40 ms of delay (e.g. entailing packetization and algorithmic delays)

The media processing (transcoding) in step 2 by the distributed media server $15_1$ adds 200 ms. The long delay in this step of the example is due to the fact that the distributed media server $15_1$ needs to use a relatively large de-jitter buffer, since user A's radio connection is poor and causes a high amount of jitter.

The media processing (audio mixing, video switching) in step 3 by main media server 12 adds 100ms.

The media processing (transcoding) in step 4 by the distributed media server $15_2$ adds yet another 100ms.

The media processing (including de-jitter buffering and audio and video decoding) done in step 5 by user B's communication device $14_2$ adds 50 ms.

Thus, the total delay introduced by the media processing alone is 490 ms, which delay does not even include the propagation delay of RTP packets. This is clearly too much compared to the ITU-T recommendation according to which, as mentioned earlier, the mouth-to-ear delay should be no more than 300 ms [ITU-T G.114] to keep the users satisfied.

To make matters worse, hardware virtualization may result in the delays increasing further. As an example, one of the physical servers running the virtual machines for the media servers ($15_1$, 12, $15_2$) may become overloaded, which may result in even further increased media processing delays.

A further factor increasing the mouth-to-ear delay is the latencies that media packets experience on the links between the data centers $16_1$, $16_2$, $16_3$, . . . , $16_n$ on which the media servers 12, $15_1$, $15_2$, $15_3$, . . . , $15_n$ are running. If the links get congested, this may result in large increases in these delays.

Yet another factor that may increase the mouth-to-ear delay is the use of adaptive jitter buffers. If a given media server 12, $15_1$, $15_2$, $15_3$, . . . , $15_n$ or user communication device $14_1$, $14_2$, $14_3$, . . . , $14_n$ needs to increase the size of its adaptive jitter buffer, this will result in the mouth-to-ear delay increasing as well.

From the above, it is clear that media processing done by a chain of virtualized media servers can result in unacceptably high delays. To alleviate these problems, and to reduce the delays, the present teachings provide mechanisms to make adjustments in the media server chain. By providing the controller 13 and the individual media servers 12, $15_1$, $15_2$, $15_3$, . . . , $15_n$ of the distributed media server system with information about the delay contributions of different links, media servers 12, $15_1$, $15_2$, $15_3$, . . . , $15_n$, and communication devices $14_1$, $14_2$, $14_3$, . . . , $14_n$ in the chain, they are enable to take actions whenever they notice that delays are becoming too high.

The estimation of end-to-end Round-Trip Time (RTT) between two endpoints in the network 10 may be done using Network Time Protocol (NTP) timestamps in Real-Time Control Protocol (RTCP) Sender Report (SR) and Receiver Report (RR) messages. The timestamp that the sender of an RTCP SR includes in the SR message is reflected back by the receiver in an RTCP RR message. This mechanism makes it possible to estimate the end-to-end RTT between the sender and the receiver. However, this RTT estimate is the RTT of the RTCP messages. Therefore, it does not include the media processing delays caused by the media servers 12, $15_1$, $15_2$, $15_3$, . . . , $15_n$. Further, no information about the one-directional mouth-to-ear delay or about the delay contribution of individual media servers or communication devices are obtained by these prior art messages. Therefore, it is clear that using RTCP SR and RR messages for dynamic reconfiguration of the media processing chain is not sufficient.

In view of the above, the present teachings introduce metadata to be conveyed in media packets. In particular, following pieces of metadata may for example be conveyed in media packets:

Priority of the media stream to which the media packet belongs. This value specifies how important this media stream is compared to other media streams in the system.

Mouth-to-ear delay budget for the media stream. This value specifies what the maximum mouth-to-ear delay is that the media packets can experience.

List of component delays that the media sample carried in the media packet has experienced so far. Component delays refer to the delays introduced for instance by individual media servers $12, 15_1, 15_2, 15_3, \ldots, 15_n$ and the sending user's communication device $14_1, 14_2, 14_3, \ldots, 14_n$.

List of propagation delays that the media packet has experienced so far. Propagation delays refer to delays between a pair of two media servers $12, 15_1, 15_2, 15_3, \ldots, 15_n$ (or a media server $12, 15_1, 15_2, 15_3, \ldots, 15_n$ and communication device $14_1, 14_2, 14_3, \ldots, 14_n$) in the network 10. These delays can be measured by the media servers $12, 15_1, 15_2, 15_3, \ldots, 15_n$ and user devices $14_1, 14_2, 14_3, \ldots, 14_n$ for instance through the periodic exchange of measurement messages (request/response pairs) sent in-band within the media streams. Alternatively, if every media server $12, 15_1, 15_2, 15_3, \ldots, 15_n$ overwrites the timestamps in (i.e. terminates) RTCP messages, information about RTTs can be obtained from the timestamps in RTCP messages.

Estimated delays, e.g. propagation delays and processing delays, which the media packet will experience along the communication path to the receiving party, e.g. estimated propagation delay to the next media server or all the way to the receiving party.

Also additional metadata that is deemed useful may be included, e.g., information about packet loss or jitter, or identifiers that can be used to identify the media servers along the chain.

It is noted that the above list contains possible pieces of metadata. Media packets may or may not carry all of this data; as an example, some systems might exchange information about the mouth-to-ear delay budget or priority in control signaling (e.g. Session Initiation Protocol (SIP)/ Session Description Protocol (SDP)) rather than include it in the media packets.

The above-mentioned metadata may be carried either in RTP packets, e.g. by using the RTP header extension mechanism, or the metadata may be carried in RTCP extensions. A benefit of carrying the metadata in RTP packets is that the metadata is more real-time. However, this may entail increased packet size. If the metadata is carried in RTCP messages, it represents averages taken over multiple RTP packets and is thus less real-time.

The use of the metadata in media packets is in the following explained by means of an example. Assuming that the metadata is being used in the scenario shown in FIG. 2, the use of metadata on the chain starts from user A having communication device $14_1$ and ends at user B having communication device $14_2$. That is, the chain communication device $14_1$ of user A→distributed media server $15_1$→main media server $12$→distributed media server $15_2$→communication device $14_1$ of user B uses metadata as follows:

User A's communication device $14_1$ includes its delay contribution as metadata to the media packet. It also adds the desired maximum mouth-to-ear delay budget for the media stream, which in this case has a value of 300 ms. Finally, also a priority value is included.

Distributed media server $15_1$ adds its delay contribution. It also adds a one-directional link delay estimate for the link between communication device $14_1$ of user A and distributed media server $15_1$.

Main media server 12 adds its delay contribution. It also adds a one-directional link delay estimate for the link between the main media server 12 and distributed media server $15_1$.

Distributed media server $15_2$ adds its delay contribution. It also adds a one-directional link delay estimate for the link between the main media server 12 and the distributed media server $15_2$.

Owing to the inclusion of the metadata to the media streams, every media server $12, 15_1, 15_2$ along the media processing chain has real-time or near-real-time information about the delays that the media packets experience in the chain. Depending on how the system has been configured, the media servers $12, 15_1, 15_2$ may also report this information to the controller 13. Since the metadata is sent in both directions along the chain (e.g., from user A to user B, and from user B to user A), a media server $12, 15_1, 15_2$ receiving a media packet has an estimate of the delay that the media packet has experienced so far in the chain. Further, the media server $12, 15_1, 15_2$ also knows how much further delay the media packet is likely to experience before it reaches the end of the chain. Based on this information, any media server $12, 15_1, 15_2$ along the chain (and also the controller 13) can monitor whether the mouth-to-ear delay budget requirement set for the media stream is being met or not. If the delay budget requirement is not being met, the media servers $12, 15_1, 15_2$ and/or the controller 13 can modify the chain to ensure that the requirement can be met. Examples of how the media processing chain can be modified are given below.

A first example of the modification of the chain comprises transferring transcoding responsibility to another node. FIG. 2 shows two users using audio and video codecs different from those used by the main conference. User A (connected to media server $15_1$, also denoted MS-A in the FIG. 2) is using the VP8 video codec and the OPUS audio codec. User B (connected to media server $15_2$, also denoted MS-B in the FIG. 2) is using the HEVC video codec and the EVS audio codec. The main conference is using H.264 video and G.711 audio. Therefore, media server MS-A and media server MS-B end up performing transcoding for both the video and audio streams. This results in high media processing latency since in total, there are two transcoding steps at media server MS-A and media server MS-B and one decoding and encoding step required by audio mixing at media server MS-1.

Assuming that at the start of the conference, the delay budget requirement for the conference can be fulfilled. However, at some point one of the media servers (for instance media server 12, also denoted MS-1 in the FIG. 2) notices that the delay budget requirement is not being met anymore based on the metadata carried in the media streams. Looking at the list of delays (component delays and propagation delays) carried in the metadata, media server MS-1 notices that media server MS-B's component delay has grown considerably. This might be due to reasons such as the need to use longer adaptive de-jitter buffer at media server MS-B. Such need to use a longer buffer may for example have been triggered by degraded radio link quality for User B. Another reason to the growing delay may be that the physical server running the media server MS-B in a virtual machine is getting overloaded.

Having noticed the problem, media server MS-1 decides (or informs the controller node 13) that the delay budget requirement cannot be met. In this case, the controller node 13 decides to stop performing transcoding at media server MS-B and instead take the additional cost (in terms of processing) of transcoding the media streams for User-B already at media server MS-1. Such decision might be made for instance based on media server MS-1 having some unused capacity available for performing transcoding. The benefit of this action is that it reduces the delays since one encoding and decoding (i.e. transcoding at media server MS-B) step is removed from the chain.

The transfer of the transcoding responsibility can be implemented as follows. Initially, for a short period of time after the need to transfer the responsibility has been detected, both media server MS-1 and media server MS-B perform transcoding and there are four media streams being exchanged between media server MS-1 and media server MS-B for User B. These are the H.264, G.711, HEVC, and EVS media streams. When media server MS-B notices that it is now receiving also HEVC and EVS streams from media server MS-1, it can stop transcoding locally and instead relay the HEVC and EVS streams directly to User B. After this, media server MS-1 can stop sending H.264 and G.711 streams to media server MS-B as those are no longer needed.

Another example of the modification of the chain comprises disabling adaptation in a node. Referring again to FIG. 2, media server $15_3$, also denoted MS-C, is performing video bitrate adaptation for User-C. Video bitrate adaptation requires encoding and decoding the video stream, which causes additional delay. If media server MS-C observes, based on the metadata, that the delay budget requirement is no longer being met, one action it can take is to stop performing video bitrate adaptation if it estimates that the positive impact of doing so on the delay outweighs the negative impact of not adapting the video streams. This decision could be appropriate for instance when the radio link quality for User-C has improved and transrating the video to a lower resolution (i.e., lowering the bitrate) is no longer strictly necessary.

Still another example of the modification of the chain comprises changing media server. Assuming that based on the metadata, the controller node 13 or one of the media servers 12, $15_1$, $15_2$, $15_3$ in the chain notices that the delay budget is not being met due to a single media server 12, $15_1$, $15_2$, $15_3$ causing a large delay. The large delay may be caused simply because the media server is overloaded. In such a situation, sometimes the only possible action might be to transfer the user that is being served by the media server to another media server. Therefore, the controller node 13 may create a new or find an existing media server virtual machine in another data center or on a different server of the same data center, and ask the user to leave the conference and join again using the new media server instance.

Another example of the modification of the chain comprises network reconfiguration. In the scenario described above, if the underlying network supports Software Defined Networking (SDN) type of behavior and virtual machine mobility between data centers, instead of making the user leave and re-join the conference, an alternative would be to transfer the virtual machine from the overloaded server to another server perhaps in a different data center.

Another example of the modification of the chain comprises influencing adaptive de-jittering decisions. The metadata carried in the media streams can also be used as an input for adaptive de-jittering decisions. Before making a decision to increase the size of the jitter buffer, the endpoint (e.g., a user device) should check how much delay budget there is left in the media packets. If it appears that the delay budget of media packets has already been consumed when they reach the endpoint, it might be unacceptable to increase the size of the jitter buffer considerably. Alternatively, if there is plenty of budget left, then the size of the buffer can be safely increased to a maximum size that can be calculated based on the metadata.

Another example of the modification of the chain comprises modifying packetization delay. One further action that the media servers 12, $15_1$, $15_2$, $15_3$, . . . , $15_n$ and communication devices $14_1$, $14_2$, $14_3$, . . . , $14_n$ can take when the metadata indicates that the delay budget requirement is not being met is to reduce the RTP packetization interval, potentially along the whole chain.

Another example of the modification of the chain comprises introducing local mixing and switching. FIG. 1 illustrates a case where there are multiple users (User B and User C) connected to the same local media server 3B. When the metadata indicates that the mouth-to-ear delay requirement is not being met for conversations between the media server's local users, a local media server 3B serving multiple users can stop forwarding the users' media streams to the central media server 3 and instead start performing local audio mixing and video switching. This will reduce the delays for media exchanged between the local users.

Another example of the modification of the chain comprises reducing media quality. Thus, yet another action that can be taken to ensure that the mouth-to-ear delay budget is not exceeded is to lower the quality of the media streams. An encoder running on a media server or user device may, among other things:

Switch to a lower-quality or lower bitrate encoding mode that reduces the algorithmic delay caused by the codec. Lowering the algorithmic delay results in lower mouth-to-ear delay.

Switch to lower spatial (amount of pixels) or temporal (frame rate) video resolution. This among other things reduces the Central Processing Unit (CPU) load, which is beneficial if the media server is experiencing overload.

Another example of the modification of the chain comprises dropping layers. If a media server or communication device notices, based on the metadata, that the delays on some link along the chain have increased (e.g., due to congestion) and if the video streams are being sent using layered video encoding (such as H.264 Scalable Video Coding (SVC)), the media server or communication device can make a decision to drop some of the layers from the video stream. This will reduce the congestion since the bitrate of the video stream will go down.

Another example of the modification of the chain comprises disabling simulcast, wherein communication devices and media servers are sending multiple parallel encodings for the same video and audio streams. When the use of metadata in accordance with what has been described is implemented in a conference relying on simulcast, it is possible to reduce the load of a media server in the chain by disabling simulcast in the chain at and before that media server and instead perform the transcoding to multiple parallel formats at a media server further along the chain.

As an example, assume that simulcast is being used in the scenario illustrated in FIG. 2. In this case, User A is sending multiple parallel encodings to media server MS-A, which relays them to media server MS-1. When the metadata received by the media server MS-1 indicates that too much of the delay budget is being consumed by the sub-chain starting from User A and going through media server MS-A. Such large delay budget consumption might for instance be caused by overload at media server MS-A or network congestion. Media server MS-1 can indicate to User A and MS-A that they should stop simulcast and only send one encoding. Media server MS-1 can then assume the responsibility to generate the additional encodings from the single stream that it is receiving from media server MS-A.

Yet another example of the modification of the chain comprises switching access network. Many communication devices have multiple wireless interfaces, such as Wireless Fidelity (Wi-Fi) and Long Term Evolution (LTE). If the metadata received by a media server indicates that the delay budget requirement is not being met for media streams originating from such a communication device, one possible action is to order the communication device to switch from a high-latency interface (e.g. Wi-Fi) to a lower latency interface (LTE).

Another example of the modification of the chain comprises re-routing media streams. In some distributed cloud configurations, the data centers may be interconnected via multiple parallel links. As an example, in FIG. 2, media server MS-A and media server MS-1 might be interconnected both by an Multiprotocol Label Switching Virtual Private Network (MPLS VPN) link and a best-effort link going over the public Internet. If the metadata indicates that the delay budget requirement is not being met, media server MS-A and media server MS-1 can re-route the media streams between them to the (perhaps more expensive) MPLS VPN connection that provides higher bandwidth and lower latency.

From the various examples above, it is clear how the metadata associated with media streams can be used in real-time by the network 10 and the distributed cloud 11 in order to make adjustments in the media processing chain. Further, the metadata may be stored in a database containing historic information about different communication devices $14_1, 14_2, \ldots, 14_n$, media servers $12, 15_1, 15_2, 15_3, \ldots, 15_n$, and cross-data center links in the network 10. Such database can then be mined for data in order to make decisions about the configuration of the media processing chain for future conferences.

The metadata has been described as included in the media packets. It is however noted that such metadata could also be carried in control messages, e.g. in the messages of a media server control protocol (e.g., H.248) by using appropriate extensions and formats. Each media server $12, 15_1, 15_2, 15_3, \ldots, 15_n$ may thus include such metadata in the control signaling that it performs, e.g. to the controller node 13. This enables the controller node 13 to be aware of the performance of the individual media servers $12, 15_1, 15_2, 15_3, \ldots, 15_n$, in view of fulfilling the delay budget requirement and also take actions based on the metadata.

In some scenarios, some of the metadata may be removed from the media packets. Instead, every media server $12, 15_1, 15_2, 15_3, \ldots, 15_n$ and communication device $14_1, 14_2, \ldots, 14_n$ processing the media stream periodically reports the metadata it has collected about the media stream to the controller node 13 of the media servers $12, 15_1, 15_2, 15_3, \ldots, 15_n$. That is, instead of including information about for instance component delays and propagation delays as metadata to the media packet, every media server $12, 15_1, 15_2, 15_3, \ldots, 15_n$ and communication device $14_1, 14_2, \ldots, 14_n$ along the media processing chain reports this information to the controller node 13. The controller node 13 then forms a picture about delays in the end-to-end media processing chain using the information every media server $12, 15_1, 15_2, 15_3, \ldots, 15_n$ and communication device $14_1, 14_2, \ldots, 14_n$ has reported and takes appropriate actions.

Such approach may however not be suitable for all types of scenarios. For example, in a distributed cloud, one controller node 13 may be controlling even tens of thousands of media server virtual machines. Thus, every media server $12, 15_1, 15_2, 15_3, \ldots, 15_n$ reporting media stream level information to the controller node 13 might not simply be scalable. Further, the data that is reported by the media servers $12, 15_1, 15_2, 15_3, \ldots, 15_n$ typically need to be periodic and represent averages to keep the amount of traffic manageable. Thus, real-time reaction to changes in the mouth-to-ear delay might not be possible.

In an aspect, the present teachings may be used in a distributed system having synchronized clocks. RTP packets carry 32-bit timestamp values whose initial values are randomly offset and thus do not represent the wall-clock time. However, since RTCP messages carry both 64-bit timestamps that use the wall-clock time and randomly offset RTP timestamps, it is possible to map the randomly offset RTP timestamps to wall-clock time. Thus, in a system where both communication devices $14_1, 14_2, \ldots, 14_n$ and all the media servers $12, 15_1, 15_2, 15_3, \ldots, 15_n$ in the distributed media processing chain have synchronized clocks, the RTP timestamps can be used to determine the delays that a packet has experienced.

This feature may be useful in many situations, disregarding the fact that many user devices $14_1, 14_2, \ldots, 14_n$ do not have clocks synchronized with media servers $12, 15_1, 15_2, 15_3, \ldots, 15_n$, and that media servers $12, 15_1, 15_2, 15_3, \ldots, 15_n$ acting as RTP translators modifying data in the packets or as RTP mixers overwrite the RTP timestamps in the media packets. For example, in a scenario where it is somehow known that no media server $12, 15_1, 15_2, 15_3, \ldots, 15_n$ in the chain overwrites the RTP timestamps and where all media servers $12, 15_1, 15_2, 15_3, \ldots, 15_n$ and communication devices $14_1, 14_2, \ldots, 14_n$ have synchronized clocks, it is possible to use the RTP and RTCP timestamps to determine the delay budget that an RTP packet has consumed, provided that metadata about the delay budget has been communicated in control signaling during session establishment (e.g. in SIP/SDP as described earlier). In such a scenario, as an optimization, there is no need to include metadata about component and propagation delays in the media packets. However, it is noted that the only information that a receiver of the media packet can determine is the delay budget the media packet has consumed so far; without the list of component and propagation delays, it is not possible to determine the contributions of different parts in the media processing chain to the delay.

Figure 3:
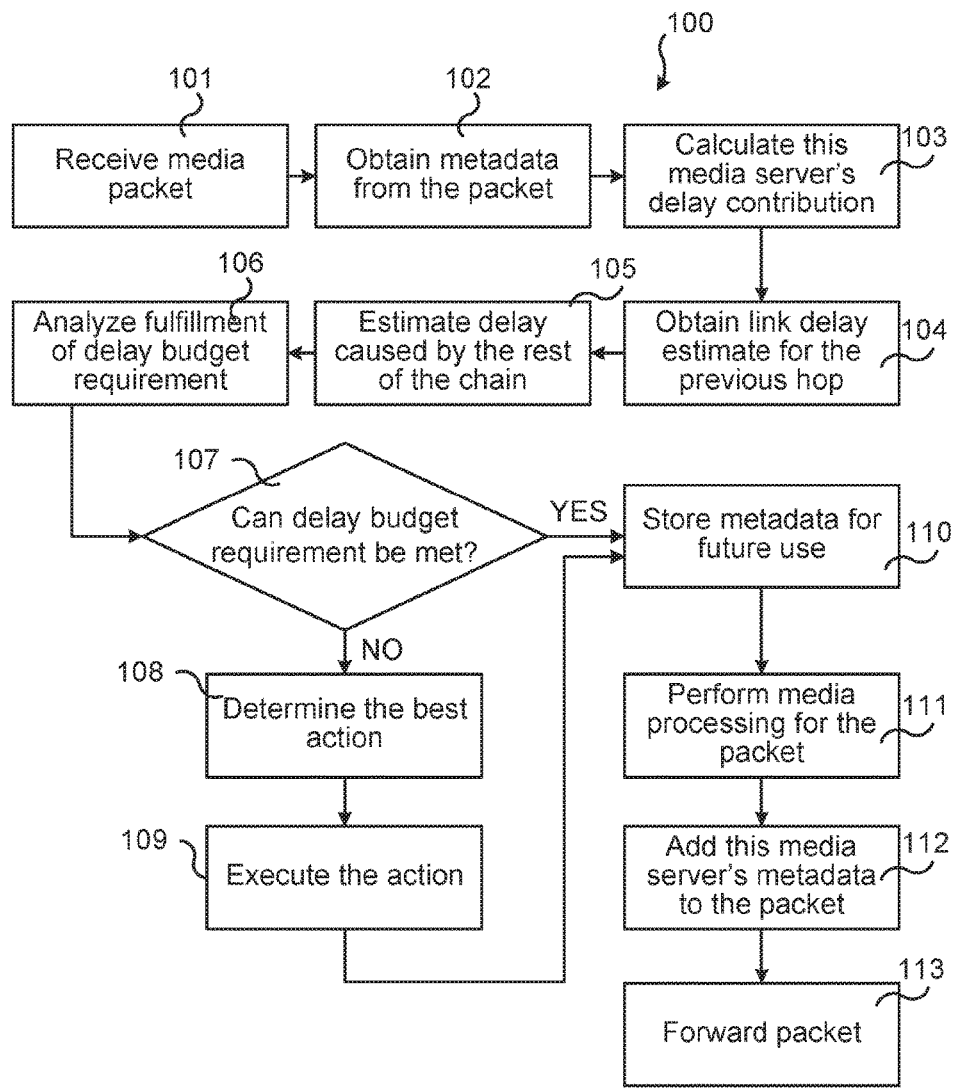
FIG. 3 is a flow chart illustrating operations performed in a network node in accordance with the present teachings.

FIG. 3 is a flow chart illustrating operations performed in a network node, such as media servers $12, 15_1, 15_2, 15_3, \ldots, 15_n$, in accordance with the present teachings. In particular, the flow chart 100 illustrates how the metadata may be used to enable dynamic media processing chain reconfiguration.

In box 101, a media server $12, 15_1, 15_2, 15_3, \ldots, 15_n$ receives a media packet coming from a previous hop media server $12, 15_1, 15_2, 15_3, \ldots, 15_n$ or communication device $14_1, 14_2, \ldots, 14_n$ in the distributed media processing chain.

The flow continues to box 102, wherein the media server $12, 15_1, 15_2, 15_3, \ldots, 15_n$ obtains the metadata carried in the media packet. The metadata consists of any combination of the pieces of information as described earlier, for example mouth-to-ear delay, and/or list of component delays experienced so far.

The flow continues to box 103, wherein the media server $12, 15_1, 15_2, 15_3, \ldots, 15_n$ calculates its own delay contribution. The delay contribution may be defined as the difference in time between the moment when the media server $12, 15_1, 15_2, 15_3, \ldots, 15_n$ receives the media packet and the moment when it forwards the media packet.

Next, in box 104, the media server 12, 15₁, 15₂, 15₃, ..., 15$_n$ may also obtain a link delay estimate for the delay that the packet experienced while propagating from the previous hop media server 12, 15₁, 15₂, 15₃, ..., 15$_n$ or communication device 14₁, 14₂, ..., 14$_n$ to this media server 12, 15₁, 15₂, 15₃, ..., 15$_n$. The link delay estimate may be based for instance on periodic WIT measurements between this media server 12, 15₁, 15₂, 15₃, ..., 15$_n$ and the previous hop, as has been described earlier.

The flow continues to box 105, wherein the media server 12, 15₁, 15₂, 15₃, ..., 15$_n$ uses information it has obtained from media packets it has received in the past from both ends of the media processing chain to form an estimate of how much delay the media packet is likely to experience before its content is played out to the receiving user at the end of the chain.

Next, in box 106, based on the information obtained in steps of boxes 102-105, the media server 12, 15₁, 15₂, 15₃, ..., 15$_n$ analyzes whether the delay budget requirement for this media stream is being met.

Next, in box 107, depending on whether or not the delay budget requirement can be met (as determined in box 106), the media server 12, 15₁, 15₂, 15₃, ..., 15$_n$ either proceeds to box 108 ("No", the requirement cannot be met) or box 110 ("Yes", the requirement can be met).

Thus, if the requirement cannot be met, the flow continues to box 108, wherein the media server 12, 15₁, 15₂, 15₃, ..., 15$_n$ determines the best action to adjust the media processing chain so that the delay requirement can be met for future media packets. The best action may be determined together with the controller node 13 (or by the controller node 13 alone) if this media server 12, 15₁, 15₂, 15₃, ..., 15$_n$ does not have enough information about the different processing steps taking place in the media processing chain. Various examples of actions that can be executed have been given, e.g. transferring transcoding responsibility, disabling adaptation, changing media server etc.

In box 109, the action determined in box 108 is executed

If the requirement (box 107) can be met, and when action as executed in box 109 has been completed, the flow continues to box 110, wherein storing may be performed. Box 110 thus illustrates that the media server 12, 15₁, 15₂, 15₃, ..., 15$_n$ may store the metadata obtained from the packet for future use.

Next, in box 111, the media server 12, 15₁, 15₂, 15₃, ..., 15$_n$ performs the media processing actions needed by the media packet.

Next, in box 112, the media server 12, 15₁, 15₂, 15₃, ..., 15$_n$ adds its own metadata to the media packet.

Next, in box 113, the media server 12, 15₁, 15₂, 15₃, ..., 15$_n$ forwards the media packet to the next hop media server 12, 15₁, 15₂, 15₃, ..., 15$_n$ or communication device 14₁, 14₂, ..., 14$_n$.

It is noted that all steps are not necessarily always performed and that the steps may be performed in another order than the illustrated one. For example, the storing of metadata (box 110), although valuable for future use, such storing may be omitted. The flow from boxes 107 and 109 would then e.g. continue to box 111 instead of box 110.

Figure 4:
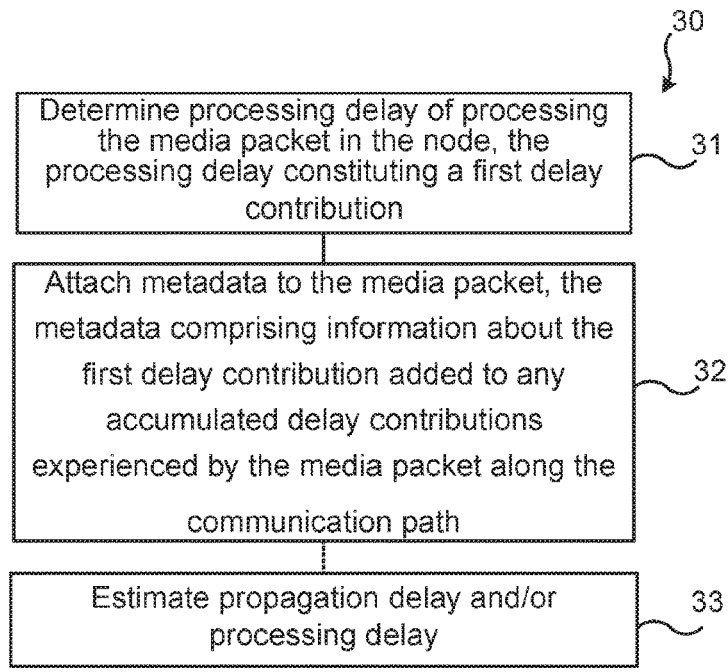
FIG. 4 is a flow chart over steps of a method in a network node in accordance with the present teachings.

FIG. 4 is a flow chart over steps of a method in a network node in accordance with the present teachings. The method 30 may be used for handling latency performed in a node 12, 15₁, 15₂, 15₃, ..., 15$_n$ of a distributed cloud 11. The node 12, 15₁, 15₂, 15₃, ..., 15$_n$ is configured to handle a subset of media processing required by a media service and the distributed cloud 11 comprises two or more such nodes 12, 15₁, 15₂, 15₃, ..., 15$_n$. A communication path for the media service is configured between at least a first and a second communication device 14₁, 14₂, the media service being provided by media streams comprising media packets and the communication path involving two or more of the nodes 12, 15₁, 15₂, 15₃, ..., 15$_n$.

The method 30 comprises determining 31 processing delay of processing the media packet in the node 12, 15₁, 15₂, 15₃, ..., 15$_n$, the processing delay constituting a first delay contribution.

The method 30 comprises attaching 32 metadata to the media packet, the metadata comprising information about the first delay contribution added to any accumulated delay contributions experienced by the media packet along the communication path.

In an embodiment, the method 30 comprises, before the attaching 32 of metadata, estimating 33 propagation delay to the next node 12, 15₁, 15₂, 15₃, ..., 15$_n$ of the communication path, the propagation delay constituting a second delay contribution and wherein the metadata further comprises the second delay contribution. The step of estimating 33 is illustrated as an optional step of the method 30 by dashed line in FIG. 4. By estimating propagation delay to the next node in the communication path, the node may predict if a delay budget will be exceeded and possibly take proper action based thereon.

In a variation of the above embodiment, the estimating 33 instead comprises estimating at least one of propagation delay and processing delay of the communication path remaining to the receiving communication device 14₁, 14₂, the metadata further comprising the at least one of estimated propagation delay and processing delay. This again provides the advantage of being able to know or predict early whether the delay budget can be met and thus take early action. Predicting propagation delay and/or processing delay all the way to the receiving party and adding this to the delay experienced so far and comparing with the delay budget a fairly good picture of the delay can be obtained.

In an embodiment, the attaching 32 of the metadata comprises adding the determined processing delay to existing metadata in the media packet relating to delay contributions. A total delay experienced thus far may thus be obtained in a simple manner.

In an embodiment, the metadata further comprises information about priority of the media stream to which the media packet belongs and wherein the method 30 comprises handling the media packet in accordance with the priority. This provides an advantage e.g. in that highly prioritized media streams can be processed with priority, e.g. allocating processing resources so as to be certain that delay budget is kept. Such allocation of processing resources may for example comprise providing additional virtual machines for the processing or providing larger capacity servers for the processing.

In an embodiment, the metadata further comprises a mouth-to-ear delay budget for the media stream and the method 30 comprises comparing the mouth-to-ear delay budget with the metadata relating to delay contributions. As mentioned earlier, an advantage is that action may be taken early to ensure that the mouth-to-ear delay budget is met.

In a variation of the above embodiment, the method 30 comprises when the comparing results in the delay contributions exceeding the mouth-to-ear delay budget, adjusting in real-time the media processing along the communication path so as to reduce the delay.

In an embodiment, the method 30 comprises determining, based on the metadata, that the media stream is failing to meet a delay budget requirement and in response thereto performing one or more of: stop performing transcoding in the node 12, $15_1$, $15_2$, $15_3$, ..., $15_n$ and transferring the transcoding to another node 12, $15_1$, $15_2$, $15_3$, ..., $15_n$ of the communication path; stop performing bitrate adaptation; reducing packetization interval; reducing quality of the media stream by switching to a lower bitrate encoding mode or to a lower spatial or temporal video resolution; dropping one or more layers from the media stream; disabling, for a simulcast media service, simulcasting; and rerouting the media stream. There are thus numerous action to choose from and to take for adjusting the media processing along the communication path.

In an embodiment, the method 30 comprises including the metadata in a control message sent to a controller node 13. Advantages such as enabling the controller node 13 to detect delay causes (e.g. a media server being a bottleneck) in a media stream and having a general view of a media processing chain are thereby achieved.

Figure 5:
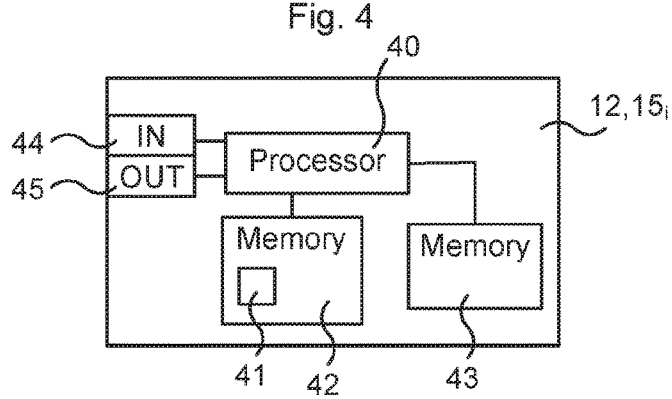
FIG. 5 illustrates schematically a network node and means for implementing methods in accordance with the present teachings.

FIG. 5 illustrates schematically a network node and means for implementing methods in accordance with the present teachings. The network node 12, $15_1$, $15_2$, $15_3$, ..., $15_n$ comprises a processor 40 comprising any combination of one or more of a central processing unit (CPU), multiprocessor, microcontroller, digital signal processor (DSP), application specific integrated circuit etc. capable of executing software instructions stored in a memory 42, which can thus be a computer program product 42. The processor 40 can be configured to execute any of the various embodiments of the method as described earlier, e.g. in relation to FIG. 4.

In particular, a node 12, $15_1$, $15_2$, $15_3$, ..., $15_n$ of a distributed cloud 11 is provided. The network node 12, $15_1$, $15_2$, $15_3$, ..., $15_n$ is configured to handle a subset of media processing required by a media service and the distributed cloud 11 comprises two or more such nodes 12, $15_1$, $15_2$, $15_3$, ..., $15_n$. A communication path for the media service is configured between at least a first and a second communication device $14_1$, $14_2$, the media service being provided by media streams comprising media packets and the communication path involving two or more of the nodes 12, $15_1$, $15_2$, $15_3$, ..., $15_n$. The node 12, $15_1$, $15_2$, $15_3$, ..., $15_n$ comprises a processor 40 and memory 42, the memory 42 containing instructions executable by the processor 40, whereby the node 12, $15_1$, $15_2$, $15_3$, ..., $15_n$ is operative to:
- determine processing delay of processing the media packet in the node 12, $15_1$, $15_2$, $15_3$, ..., $15_n$, the processing delay constituting a first delay contribution,
- attach metadata to the media packet, the metadata comprising information about the first delay contribution added to any accumulated delay contributions experienced by the media packet along the communication path.

In an embodiment, the node 12, $15_1$, $15_2$, $15_3$, ..., $15_n$ is configured to, before the attaching of metadata, estimate propagation delay to the next node 12, $15_1$, $15_2$, $15_3$, ..., $15_n$ of the communication path, the propagation delay constituting a second delay contribution and wherein the metadata further comprises the second delay contribution.

In an embodiment, the node 12, $15_1$, $15_2$, $15_3$, ..., $15_n$ is configured to before the attaching of metadata, estimate at least one of propagation delay and processing delay of the communication path remaining to the receiving communication device $14_1$, $14_2$, the metadata further comprising the at least one of estimated propagation delay and processing delay.

In an embodiment, the node 12, $15_1$, $15_2$, $15_3$, ..., $15_n$ is configured to attach the metadata by adding the determined processing delay to existing metadata in the media packet relating to delay contributions.

In an embodiment, the metadata further comprises information about priority of the media stream to which the media packet belongs and wherein the node 12, $15_1$, $15_2$, $15_3$, ..., $15_n$ is configured to handle the media packet in accordance with the priority.

In an embodiment, the metadata further comprises a mouth-to-ear delay budget for the media stream and the node 12, $15_1$, $15_2$, $15_3$, ..., $15_n$ is configured to compare the mouth-to-ear delay budget with the metadata relating to delay contributions.

In an embodiment, the node 12, $15_1$, $15_2$, $15_3$, ..., $15_n$ is configured to, when the comparing results in the delay contributions exceeding the mouth-to-ear delay budget, adjust in real-time the media processing along the communication path so as to reduce the delay.

In an embodiment, the node 12, $15_1$, $15_2$, $15_3$, ..., $15_n$ is configured to determine, based on the metadata, that the media stream is failing to meet a delay budget requirement and in response thereto being configured to perform one or more of: stop performing transcoding in the node 12, $15_1$, $15_2$, $15_3$, ..., $15_n$ and transferring the transcoding to another node 12, $15_1$, $15_2$, $15_3$, ..., $15_n$ of the communication path; stop performing bitrate adaptation; reducing packetization interval; reducing quality of the media stream by switching to a lower bitrate encoding mode or to a lower spatial or temporal video resolution; dropping one or more layers from the media stream; disabling, for a simulcast media service, simulcasting; and rerouting the media stream.

In an embodiment, the node 12, $15_1$, $15_2$, $15_3$, ..., $15_n$ is configured to include the metadata in a control message sent to a controller node 13.

Still with reference to FIG. 5, the memory 42 can be any combination of read and write memory (RAM) and read only memory (ROM). The memory 42 also comprises persistent storage, which, for example, can be any single one or combination of magnetic memory, optical memory, solid state memory or even remotely mounted memory.

A data memory 43 may also be provided for reading and/or storing data during execution of software instructions in the processor 40. The data memory 43 can be any combination of read and write memory (RAM) and read only memory (ROM).

The node 12, $15_i$ further comprises an input device 44 and an output device 45, which devices may be a single unit or several units and being operatively connected to the processor 40. By means of the input device 44, the node 12, $15_i$ may receive data from other nodes and devices of the distributed cloud 11, which data may be input to the processor 40. Correspondingly, by means of the output device 45, the node 12, $15_i$ may send data to other nodes and devices of the distributed cloud 11, which data may in turn be output from the processor 40.

The teachings of the present application also encompasses a computer program product 42 comprising a computer program 41 for implementing the methods as described, and a computer readable means on which the computer program 41 is stored. The computer program product 42 may be any combination of read and write memory (RAM) or read only memory (ROM). The computer program product 42 may also comprise persistent storage, which for example can be any single one or combination of magnetic memory, optical memory or solid state memory.

The present teachings thus comprise a computer program 41 for a node 12, $15_1$, $15_2$, $15_3$, ..., $15_n$ of a distributed cloud 11. The node 12, $15_1$, $15_2$, $15_3$, ..., $15_n$ is configured to handle a subset of media processing required by a media service and the distributed cloud 11 comprises two or more such nodes 12, $15_1$, $15_2$, $15_3$, ..., $15_n$. A communication path for the media service is configured between at least a first and a second communication device $14_1$, $14_2$, the media service being provided by media streams comprising media packets and the communication path involving two or more of the nodes 12, $15_1$, $15_2$, $15_3$, ..., $15_n$. The computer program 41 comprises computer program code, which, when run on the node 12, $15_1$, $15_2$, $15_3$, ..., $15_n$ causes the node 12, $15_1$, $15_2$, $15_3$, ..., $15_n$ to: determine processing delay of processing the media packet in the node 12, $15_1$, $15_2$, $15_3$, ..., $15_n$, the processing delay constituting a first delay contribution; attach metadata to the media packet, the metadata comprising information about the first delay contribution added to any accumulated delay contributions experienced by the media packet along the communication path.

A computer program product 42 is also provided comprising a computer program 41 as described above, and a computer readable means on which the computer program 41 is stored.

Figure 6:
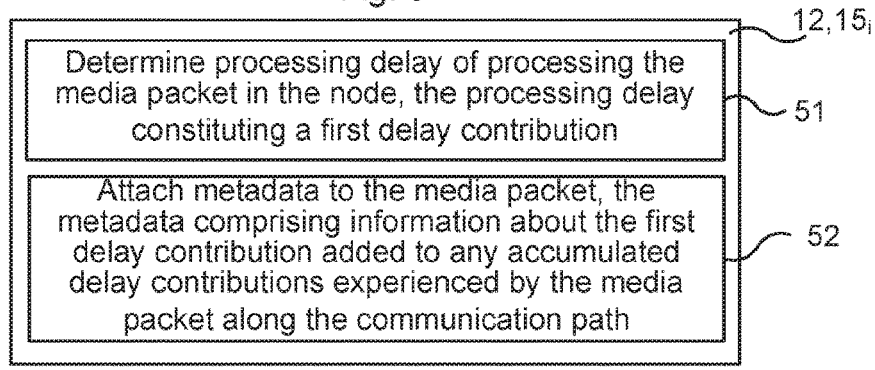
FIG. 6 illustrates a network node comprising functions modules/software modules for implementing methods in accordance with the present teachings.

An example of an implementation using functions modules/software modules is illustrated in FIG. 6, in particular illustrating a node 12, $15_i$ comprising functions modules for implementing methods of the present teachings. The node 12, $15_i$ comprises means, in particular a first function module 51 for determining processing delay of processing the media packet in the node 12, $15_1$, $15_2$, $15_3$, ..., $15_n$, the processing delay constituting a first delay contribution. The node 12, $15_i$ comprises means, in particular a second function module 52 for attaching metadata to the media packet, the metadata comprising information about the first delay contribution added to any accumulated delay contributions experienced by the media packet along the communication path.

The functional modules 51, 52 can be implemented using software instructions such as computer program executing in a processor and/or using hardware, such as application specific integrated circuits, field programmable gate arrays, discrete logical components etc. It is noted that additional such functional modules may be provided for performing additional steps of the methods as described.

The methods and devices have mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for handling latency performed in a node of a distributed cloud, the node being configured to handle a subset of media processing required by a media service and the distributed cloud comprising two or more such nodes, wherein a communication path for the media service is configured between at least a first and a second communication device, the media service being provided by media streams comprising media packets and the communication path involving two or more of the nodes, the method comprising:
   determining processing delay of processing the media packet in the node, the processing delay constituting a first delay contribution;
   attaching metadata to the media packet, the metadata comprising information about the first delay contribution added to any accumulated delay contributions experienced by the media packet along the communication path, wherein the metadata further comprises a mouth-to-ear delay budget for the media stream; and
   comparing the mouth-to-ear delay budget with the metadata relating to delay contributions.

2. The method of claim 1, comprising, before the attaching of metadata, estimating propagation delay to the next node of the communication path, the propagation delay constituting a second delay contribution, and wherein the metadata further comprises the second delay contribution.

3. The method of claim 1, comprising, before the attaching of metadata, estimating at least one of propagation delay and processing delay of the communication path remaining to the receiving communication device, the metadata further comprising the at least one of estimated propagation delay and processing delay.

4. The method of claim 1, wherein the attaching of the metadata comprises adding the determined processing delay to existing metadata in the media packet relating to delay contributions.

5. The method of claim 1, wherein the metadata further comprises information about priority of the media stream to which the media packet belongs and wherein the method comprises handling the media packet in accordance with the priority.

6. The method of claim 1, comprising, responsive to the results in the delay contributions exceeding the mouth-to-ear delay budget, adjusting in real-time the media processing along the communication path so as to reduce the delay.

7. The method of claim 1, comprising determining, based on the metadata, that the media stream is failing to meet a delay budget requirement and in response thereto performing one or more of: stop performing transcoding in the node and transferring the transcoding to another node of the communication path; stop performing bitrate adaptation; reducing packetization interval; reducing quality of the media stream by switching to a lower bitrate encoding mode or to a lower spatial or temporal video resolution; dropping one or more layers from the media stream; disabling, for a simulcast media service, simulcasting; and rerouting the media stream.

8. The method of claim 1, comprising including the metadata in a control message sent to a controller node.

9. A node of a distributed cloud, the node being configured to handle a subset of media processing required by a media service and the distributed cloud comprising two or more such nodes, wherein a communication path for the media service is configured between at least a first and a second communication device, the media service being provided by media streams comprising media packets and the communication path involving two or more of the nodes, the node comprising a processor and memory, the memory containing instructions executable by the processor, whereby the node is operative to:
   determine processing delay of processing the media packet in the node the processing delay constituting a first delay contribution,
   attach metadata to the media packet, the metadata comprising information about the first delay contribution added to any accumulated delay contributions experienced by the media packet along the communication path, wherein the metadata further comprises a mouth-to-ear delay budget for the media stream; and
   compare the mouth-to-ear delay budget with the metadata relating to delay contributions.

10. The node of claim 9, wherein the memory further constrains instructions executable by the processor whereby the node is operative to, before the attaching of metadata, estimate propagation delay to the next node of the communication path, the propagation delay constituting a second delay contribution, and wherein the metadata further comprises the second delay contribution.

11. The node of claim 9, wherein the memory further constrains instructions executable by the processor whereby the node is operative to, before the attaching of metadata, estimate at least one of propagation delay and processing delay of the communication path remaining to the receiving communication device, the metadata further comprising the at least one of estimated propagation delay and processing delay.

12. The node of claim 9, wherein the memory further constrains instructions executable by the processor whereby the node is operative to attach the metadata by adding the determined processing delay to existing metadata in the media packet relating to delay contributions.

13. The node of claim 9, wherein the metadata further comprises information about priority of the media stream to which the media packet belongs and wherein the memory further constrains instructions executable by the processor whereby the node is operative to handle the media packet in accordance with the priority.

14. The node of claim 9, wherein the memory further constraints instructions executable by the processor whereby the node is operative to, responsive to the results in the delay contributions exceeding the mouth-to-ear delay budget, adjust in real-time the media processing along the communication path so as to reduce the delay.

15. The node of claim 9, wherein the memory further constrains instructions executable by the processor whereby the node is operative to determine, based on the metadata, that the media stream is failing to meet a delay budget requirement and in response thereto being operative to perform one or more of: stop performing transcoding in the node and transferring the transcoding to another node of the communication path; stop performing bitrate adaptation; reducing packetization interval; reducing quality of the media stream by switching to a lower bitrate encoding mode or to a lower spatial or temporal video resolution; dropping one or more layers from the media stream; disabling, for a simulcast media service, simulcasting; and rerouting the media stream.

16. The node of claim 9, wherein the memory further constrains instructions executable by the processor whereby the node is operative to include the metadata in a control message sent to a controller node.

17. A non-transitory computer-readable medium comprising, stored thereupon, a computer program for a node of a distributed cloud, the node being configured to handle a subset of media processing required by a media service and the distributed cloud comprising two or more such nodes, wherein a communication path for the media service is configured between at least a first and a second communication device, the media service being provided by media streams comprising media packets and the communication path involving two or more of the nodes, the computer program comprising computer program code, which, when run on the node causes the node to:
   determine processing delay of processing the media packet in the node, the processing delay constituting a first delay contribution,
   attach metadata to the media packet, the metadata comprising information about the first delay contribution added to any accumulated delay contributions experienced by the media packet along the communication path, wherein the metadata further comprises a mouth-to-ear delay budget for the media stream; and
   compare the mouth-to-ear delay budget with the metadata relating to delay contributions.

* * * * *